United States Patent [19]

Boeckmann

[11] Patent Number: 4,840,012

[45] Date of Patent: Jun. 20, 1989

[54] ZIPPERED FILM FEED

[75] Inventor: Hugo Boeckmann, Arlington Heights, Ill.

[73] Assignee: Zip-Pak Incorporated, Northbrook, Ill.

[21] Appl. No.: 130,955

[22] Filed: Dec. 10, 1987

[51] Int. Cl.⁴ ............... B65B 9/20; B65B 61/00; B65B 61/18; B65B 41/12

[52] U.S. Cl. ................... 53/410; 53/412; 53/451; 53/128; 53/133; 53/552; 226/172

[58] Field of Search ............... 53/451, 551, 552, 389, 53/133, 128, 412, 410; 226/170, 171, 172

[56] References Cited

U.S. PATENT DOCUMENTS

| | | | |
|---|---|---|---|
| 2,761,633 | 9/1956 | Sindzinski | 226/172 X |
| 3,140,030 | 7/1964 | Stewart | 226/171 X |
| 3,285,485 | 11/1966 | Slator | 226/172 |
| 3,815,317 | 6/1974 | Toss | 53/551 X |
| 4,136,505 | 1/1979 | Putnam, Jr. et al. | 53/551 |
| 4,235,064 | 11/1980 | Wenger | 53/451 |
| 4,355,494 | 10/1982 | Tilman | 53/451 X |
| 4,423,585 | 1/1984 | Monsees et al. | 53/551 X |
| 4,501,109 | 2/1985 | Monsees | 53/551 X |
| 4,620,409 | 11/1986 | McElvy | 53/551 |
| 4,625,496 | 12/1986 | Ausnit | 53/451 |
| 4,646,511 | 3/1987 | Boeckmann et al. | 53/551 |
| 4,709,533 | 12/1987 | Ausnit | 53/552 X |
| 4,727,709 | 3/1988 | Zieke et al. | 53/551 |
| 4,745,731 | 5/1988 | Talbott et al. | 53/551 X |

FOREIGN PATENT DOCUMENTS 333531 8/1930 United Kingdom ............... 53/530

Primary Examiner—Horace M. Culver

[57] ABSTRACT

A method and mechanism for advancing a continuous length of bag making plastic film having a reclosable fastener strip extending therealong with a filling tube over which the film is formed, means for sealing the edges of the film over the filling tube, opposed pairs of advancing belts for pressing the film against the tube and driving it incrementally downwardly, means for guiding the fastener between the belts of one of the pairs and means for driving the belts incrementally to move the film downwardly as it is filled and cross-sealed.

8 Claims, 3 Drawing Sheets

ZIPPERED FILM FEED

BACKGROUND OF THE INVENTION

The invention relates to reclosable bags and to methods and apparatus for the manufacture of such bags and more particularly to continuous formation of bags by a form fill and seal process with improved means for advancing the film to intermittently cross-seal and fill the bags.

Reclosable bags having male and female profile cooperating reclosable elements along the opening to the bag have been known for some considerable time. Various forms of manufacture have been employed with one method of making such a bag including extruding a tube where the reclosable elements are integral therewith and the bags are formed by flattening the tube to close the reclosable elements and to cross-seal the flattened tube transversely.

One method of forming bags has been known as the form fill and seal method wherein a continuous length of film is fed forwardly and downwardly over a forming tube with the edges of the sheet of film being sealed to each other. The thus formed tube is cross-sealed at intervals and contents are filled into the bags down through the tubular mandrel over which the bag tube is formed.

An improved form of bag made by the foregoing methods resulted from advancements in the development of reclosable fasteners. Thus, a bag formed in this manner can be openable and reclosable when film which is utilized has a reclosable continuous fastener extending therealong.

In the formation of such bags, it is necessary to intermittently advance the film over the mandrel. Between the intermittent advancement of film, the reclosable fastener (zipper) is ultrasonically spot welded to maintain engagement of the male and female profiles and provide a flattened section for cross-seals to prevent leakage. A cross-seal is formed and contents are dropped gravitationally down through the mandrel to fill the tubular bag. A bag is then advanced and another cross-seal formed to provide the top seal of the previous bag and the bottom seal of a succeeding bag.

The mechanism and method used for the advancement of the film is critical to form the bags of the proper width and it may be even more critical where printing on the bag must be kept in registry. It is also important that the film be advanced without rotating it on the mandrel so that the reclosable fastener will always remain at the right location on the side or top of the bag. Also, the bag must be advanced such that the sealing apparatus will always engage the edges of the bag to form a satisfactory seal between the film edges.

It is accordingly an object of the present invention to provide an improved structure and method for advancement of the film in a form fill and seal apparatus wherein film with a reclosable fastener is used. Another object of the invention is to provide an improved apparatus for advancement of the film in a form fill and seal mechanism wherein relatively delicate film can be handled, and can be accurately and reliably advanced so that the functions of forming the cross-seal, the filling and forming the longitudinal seal can be carried out accurately and reliably.

A further object of the invention is to provide an improved film advancing mechanism which is capable of advancing the film without wrinkling or stressing and wherein accurate control of the increment of advance can be effected.

SUMMARY OF THE INVENTION

In accordance with the present invention, thin plastic film for forming bags is advanced in a form fill and seal operation by the flat plastic film being wrapped around a tubular mandrel through which contents are filled into the finished bag. The film is advanced uniquely by driving it downwardly through engagement of the outer surface by frictional or vacuum belts. The belts are preferably in the form of two pairs of belts with one pair straddling the longitudinal fastener. The pairs are placed diametrically opposite and are of essentially identical construction so that equal and opposite forces are applied to the film so that even very fragile soft film material subject to wrinkling or stretching will be handled and advanced uniformly in a manner so that the longitudinal seam can be formed. Means are provided in advance of one pair of belts to guide the reclosable fastener accurately and reliably between two of the belts.

Other objects, advantages and features will become more apparent with the teaching of the principles of the invention in connection with the disclosure of the preferred embodiments thereof in the specification, claims and drawings in which:

DESCRIPTION OF THE PREFERRED EMBODIMENTS

Figure 1:
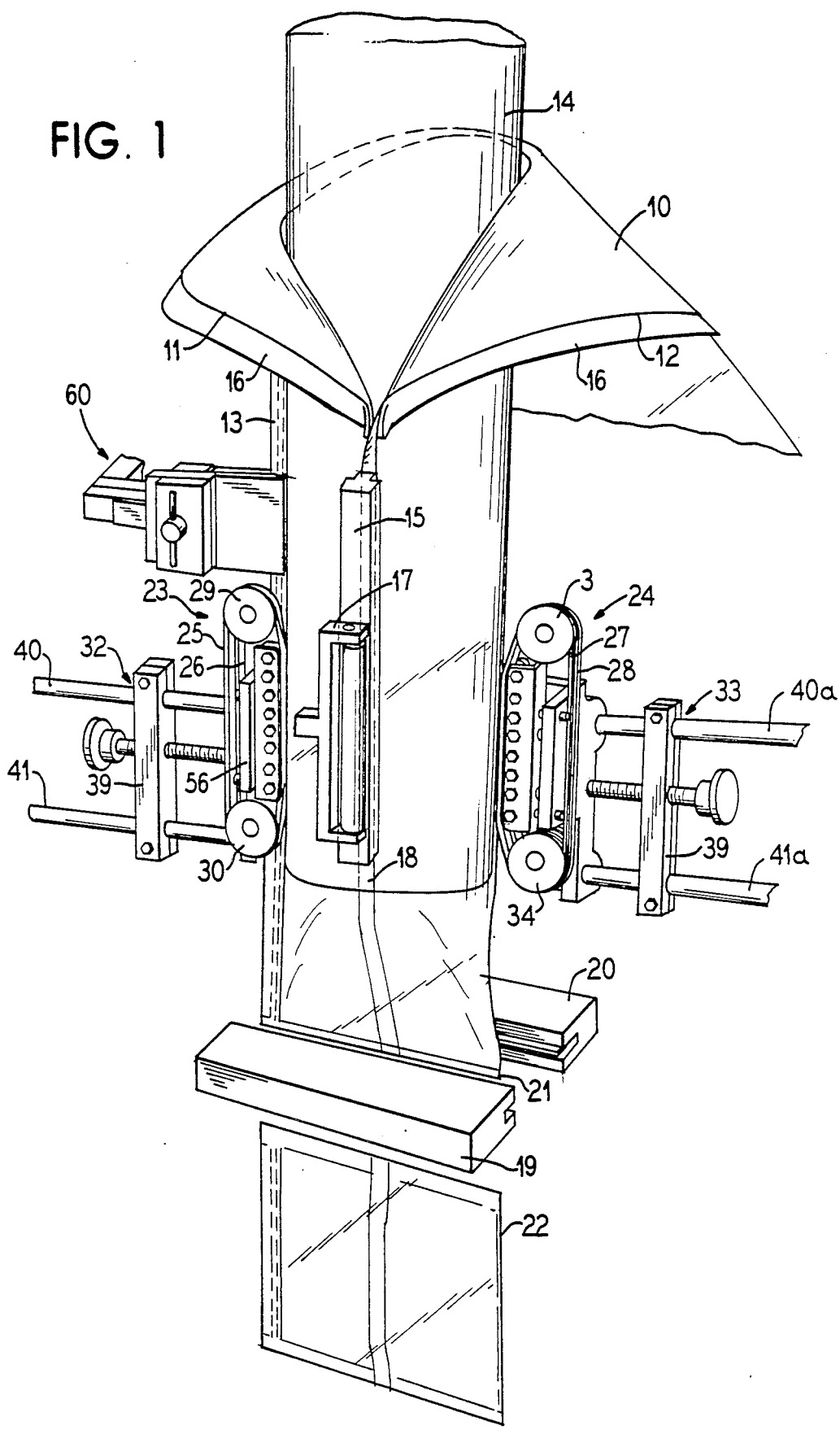
FIG. 1 is a perspective view of apparatus constructed and operated in accordance with the principles of the present invention.

As illustrated in FIG. 1, a sheet of film 10 is fed from a suitable supply to the equipment illustrated in a form fill and seal operation. The sheet of film is fed over a shaped guide having sides 16 so that it envelops a vertical hollow mandrel 14. Edges 11 and 12 of the sheet of film are brought together to be sealed. Where the film is of a material such as polyethylene, the sealing is a heat seal process and it ill be understood that various forms of single layer or multiple layer film may be employed. Along the length of the film is a continuous reclosable fastener 13. This will provide an openable and reclosable fastener for the finished package which is shown at 22.

In operation, the film must be brought forward incrementally, and as it is brought forward, the edges are sealed together to form a side seam 18. As the film is stopped, a bottom cross-seam 21 is formed and the finished bag is cut to form bag 22 as shown. When the bottom seal 21 is formed, contents are filled into the bag through the hollow mandrel 14, and then the film is again advanced so that the next filled bag can be sealed at the top and cut off.

The film must be fed forwardly in a manner so that it does not wrinkle or tear and the reclosable fastener strip 13 must be maintained in its oriented position so that it will be located at the top front of the completed bag. The incremental feed can be measured such as by an electric eye, not shown, orienting with marks on the film and this method is used where printing is on the film which must be oriented on the finished bag. Alternately, the film may be advanced a predetermined distance but with either arrangement for advancement, the advancement must be uniform and done without damage to the film. This must be accomplished with sufficient force so that the edges of the film can be brought together and formed over the mandrel and a pull must be applied to the film in such a manner without losing the orientation or damaging or wrinkling the film.

In accordance with the principles of the present invention, the film is pulled down frictionally by means having frictional engagement with the outer surface of the bag film.

As illustrated in the figures, the outer surface of the bag is engaged by first and second pairs of belts shown at 23 and 24 with the belts extending in the direction of the film advancement and having contact with the film over a substantial length.

Figure 6:
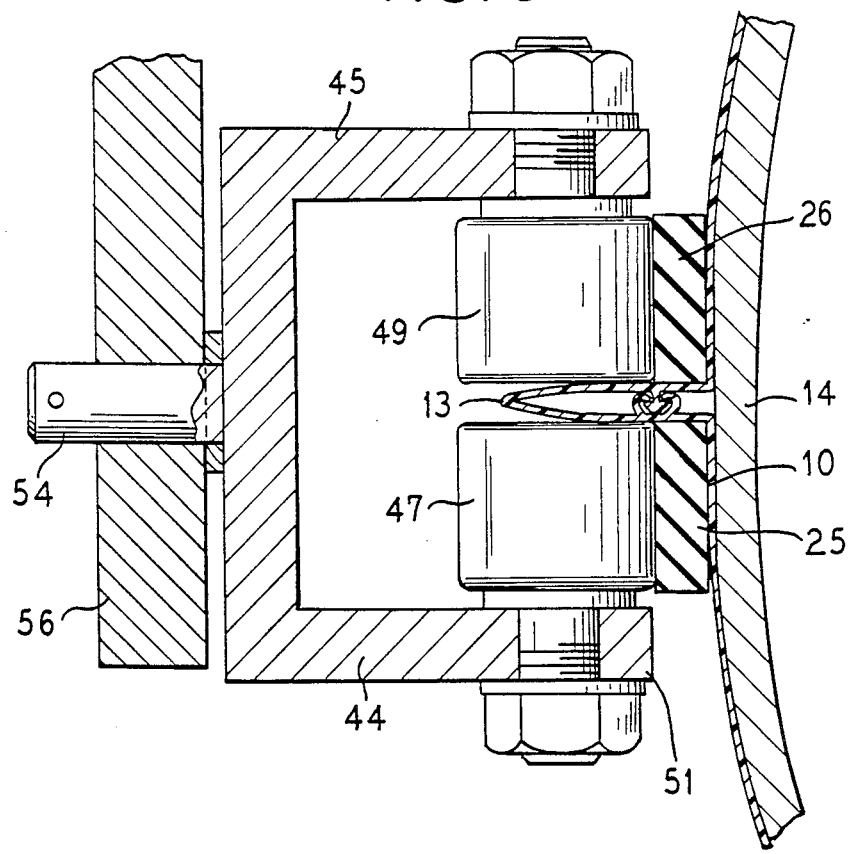
FIG. 6 is a substantially enlarged fragmentary horizontal sectional view taken substantially along line VI—VI of FIG. 2.

One pair of belts shown at 25 and 26 is positioned at one edge of the bag in a location so as to straddle the reclosable fastener and hold it in orientation essentially bracketing the fastener 13 therebetween in the manner shown in the enlarged sectional drawing of FIG. 6. Diametrically opposite the frictional advancement mechanism 23, is located the other frictional advancement member 24 having belts 27 and 28. The sets of belts on opposite sides of the film must have essentially the same frictional engagement with the film so as to pull it down evenly. The smooth outer surface of the mandrel 14 provides a support for the film as the belts engage the outer surface. The belts have a polyurethane or other frictional plastic surface which engages the film and other forms of rubber or other outer belt surfaces may be employed depending upon the film used.

In advance of the first of belts 23, a fastener guide assembly 60 is provided and the detail of this structure will be described later in connection with FIG. 5.

The side seam which is continually formed as the film is advanced is formed by a heated bar 15 supported on an arm 17. If relatively low temperatures are used, the bar 15 can stay in contact with the seam, or the bar may be lifted each time the advance of the film is stopped.

Figure 2:
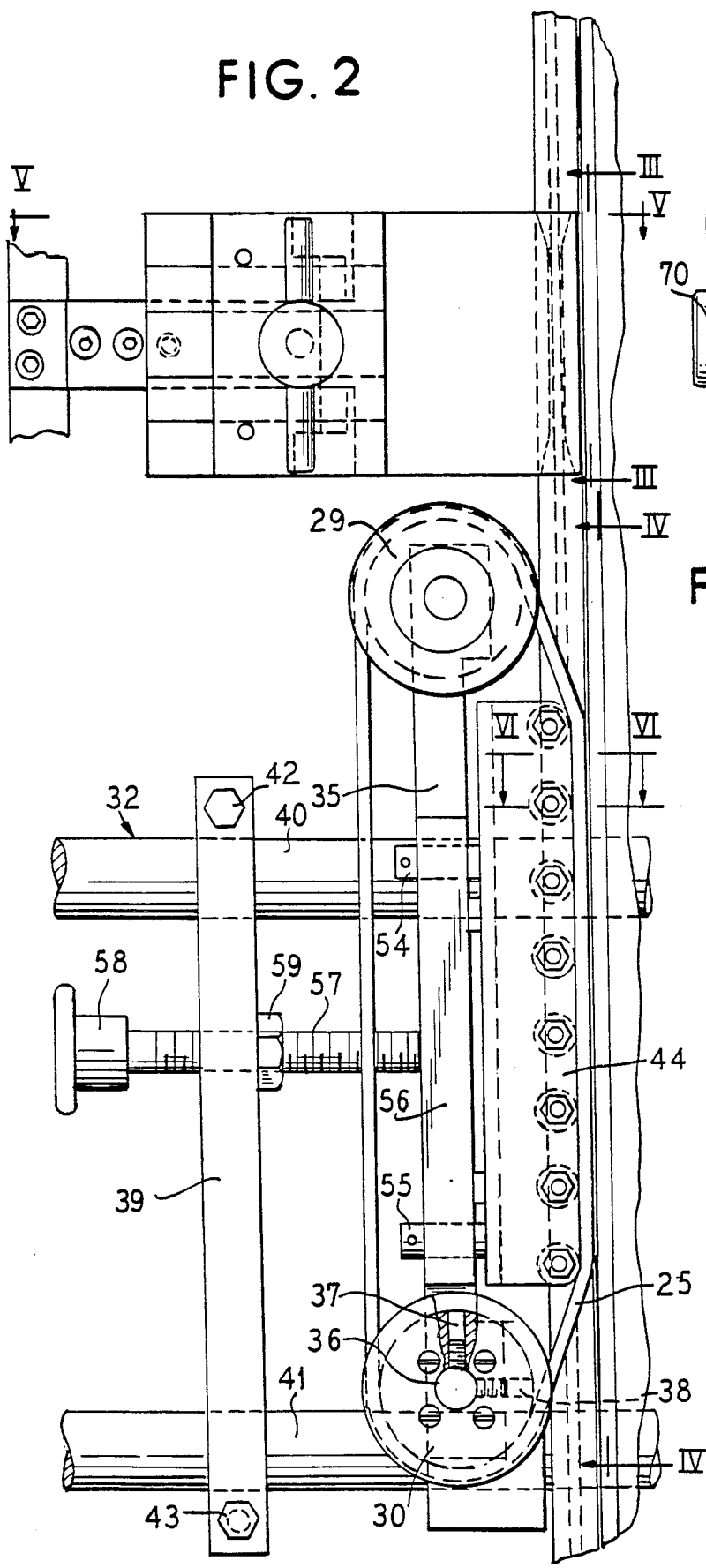
FIG. 2 is a fragmentary elevational view of a portion of the structure of FIG. 1.
Figure 3:
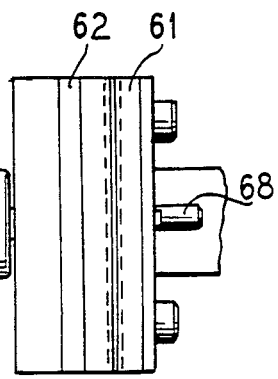
FIG. 3 is a fragmentary vertical view taken substantially along line III—III of FIG. 2.

The frictional drive belts are carried on support mechanisms 32 and 33. The belts are of essentially identical construction, and therefore only the belts and support 32 need be described in detail as shown in FIG. 2.

Fixed frame members 39, shown on the right and left of FIG. 1, support the frictional drive assemblies and the assembly 32 is supported on horizontal rods 40 and 41 for the lefthand frictional drive, and rods 40a and 41a support the righthand frictional drive. The ends of the frame piece 39 are split so that bolts 42 and 43 can be tightened to lock the rods 40 and 41 in their adjusted position.

Figure 4:
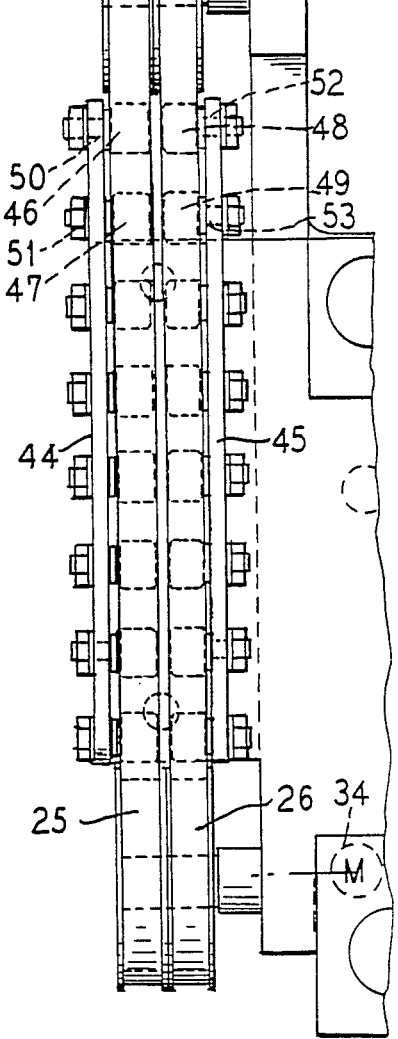
FIG. 4 is a fragmentary vertical sectional view taken substantially along line IV—IV of FIG. 2.

The rods support the dual sheaves 29 and 30 for the belts 25 and 26, and the dual sheaves 31 and 32 for the belts 27 and 28. As shown in FIG. 4, suitable drive mechanisms are provided for driving the shaft of the sheaves and motor 34 is illustrated intermittently operated by a control mechanism, not shown, so that the motor is driven for the appropriate period of time to give the advancement necessary to provide the correct length of bag 22.

The belts at each side of the mandrel are driven concurrently and for the same distance.

The belts are pressed against the plastic film with a predetermined force and for this purpose, backing rollers engage the inner surface of the belts. As illustrated in FIGS. 2 and 4, the backing rollers are arranged in tandem along behind the belts. As shown in FIG. 4, a series of rollers as illustrated at 46 and 47, back up belt 25 and a series of rollers 48 and 49 back up belt 26. These rollers are supported on their shafts in side plates 44 and 45. For purposes of assemblage of the rollers, the side plates have alternate holes to receive the roller shafts. For example, roller 46 is assembled by having its shaft inserted in a hole 50 in the frame plate 44. The adjacent roller for the belt 26 is assembled by having its shaft slid into a slot 52. Similarly, the roller 49 below roller 48 is installed by having its shaft inserted into a hole 53 in the side plate 45, while the opposite roller 47 has its shaft slid into the slot 51. In other words, the side plates 44 and 45 have alternate holes and slots which are staggered relative to the two plates 44 and 45 to permit assemblage of the rollers in the side plates.

The side plates 44 and 45 are part of a U-shaped support as shown in FIG. 6 which is mounted on shafts 54 and 55, FIG. 2, which shafts are supported on a base plate 56. The base plate is pushed inwardly to control the force that the rollers apply to the belts by threaded shaft 57 which threads into the frame 39. By turning a knob 58 on the shaft 57, the amount of force applied to the plate 56 will be determined and when the plate 56 is adjusted for the proper pressure between the rollers and the belts, it is locked in place by a locking nut 59. The belt assembly 24 on the right of FIG. 1 is adjusted in the same manner so that the belts at each side of the mandrel engage the film with equal force.

Another manner of obtaining frictional engagement between the belts and the film to advance the material is by applying a vacuum to the film through the belts. By placing a vacuum gland behind the belts and providing belts with holes extending therethrough, a low vacuum will draw the film tightly to the surface of the belts so that the film will advance with travel of the belts due to the friction between the belts and film. With the vacuum arrangement, the belts can be situated so that they do not press the film against the mandrel, but instead draw the film downwardly in light engagement with the mandrel or the belts can be spaced slightly from the mandrel. A very light vacuum will be all that is needed to firmly grip the film to the belts and the belts can be shortened so that the extent of contact between the film and belt may be less than that shown in the drawing. The vacuum will be released at the lower end of the contact between the belts and the film so that the film will be freed from the belt at the lower end of belt travel. Thus, actually the film is drawn down due to frictional engagement between the belt and film, but the frictional engagement is obtained due to vacuum rather than having the belt pressed against the film as it is slidably backed by the mandrel. Control of the frictional engagement between the film and belts can be controlled by increasing or decreasing the vacuum so as to accommodate more or less slippery film and to accommodate film which requires more or less pressure to be pulled down. Where the backing rollers are used to obtain the frictional engagement between the belt and film, the pressure of the rollers against the belt can be adjusted.

Figure 5:
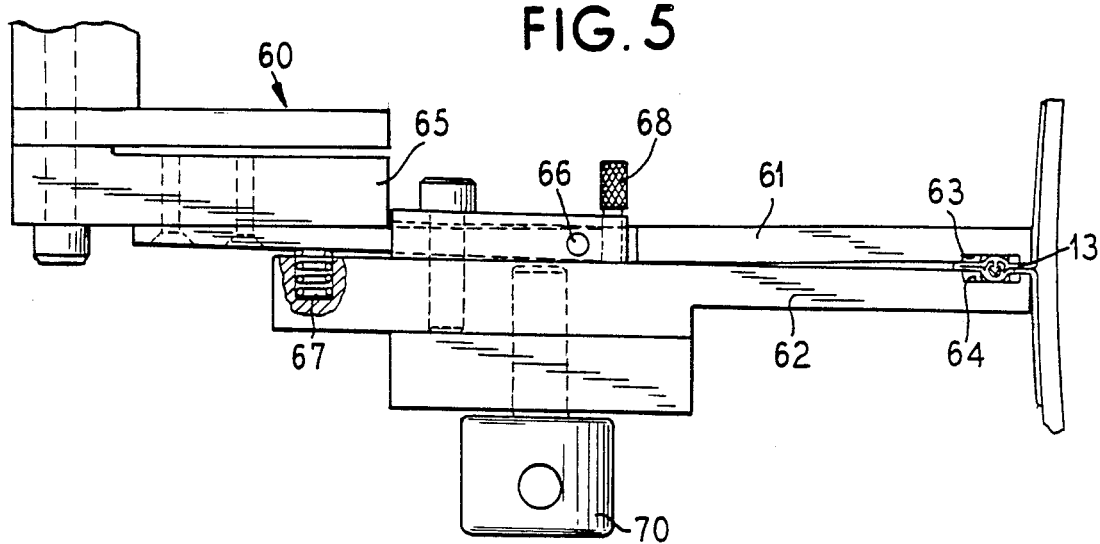
FIG. 5 is a fragmentary horizontal sectional view somewhat enlarged taken substantially along line V—V of FIG. 2.

FIG. 5 illustrates the mechanism for guiding the fastener strip 13 downwardly so that is passes directly between the belts 25 and 26. The guide 60 is supported on a frame 65 and has a fixed arm 61 and a pivotal clamp arm 62. The arm 62 has a guide recess 63 and the arm 62 has a guide recess 64 with these recesses arranged to receive the fastener strip 13. The pivotal arm 62 is pivoted at 66 on the fixed arm 61 and a compression spring 67 urges the movable arm toward the fixed arm 61. An adjustable stop screw 68 limits the pivotal movement urged by the spring so that the spacing between the grooves 63 and 64 can be set to freely pass the fastener strip as it is pulled downwardly with the film.

An additional tightening screw 70 locks the arms in their relative adjusted position.

In operation, the pair of belts 25 and 26 at one side of the mandrel and the pair of belts 27 and 28 at the other side of the mandrel are incrementally driven to draw down the plastic film. While the film is advancing downwardly, the heated bar 15 seals the edges of the film together. When a bag length is drawn downwardly, the belts stop and sealing bars 19 and 20 are brought together to form a cross-seam at the top of the filled bag and at the bottom of the succeeding bag, and the filled bag is also cut from the length of film to drop downwardly, such as illustrated by the bag 22. When the contents have been filled into the bag through the hollow mandrel 14, the belts again are driven forward to uniformly draw down the film. This operation is continually repeated in a relatively high speed manufacturing process to fill and form bags.

Thus, it will be seen that there has been provided an apparatus and method for advancing film and forming bags which meets the advantages and objectives above set forth and which is capable of operating with a variety of materials and is capable of reliably forming bags at a suitable high rate of manufacturing speed.

I claim as my invention:

1. A method of forming and shaping a permanent assembly of a sheet of plastic film with a longitudinally extending separable fastener strip thereon into a vertically upwardly opening tubular form adapted for gravitationally receiving bag filling contents in a vertical form filling and sealing packaging operation, the steps including:
    effecting cyclical dwell and intermittent downward advancing of the tube by frictionally engaging the surface of the film and pushing the film downwardly in successive cyclical increments;
    cross-sealing and filling the tube above the cross-seal and filling the tube between such increments;
    frictionally engaging the outer surface of the film at the location of the fastener strip and at a location diametrically opposed therefrom;
    and joining the edges of the film to form a tube at a location intermediate the locations of frictional engagement.

2. A mechanism for incrementally advancing a continuous sheet of plastic film having a longitudinally extendible reclosable fastener strip thereon over a vertical tubular form in a form fill and seal process comprising:
    longitudinal sealing means sealingly joining the longitudinal edges of a sheet of bag forming plastic film;
    cross-sealing means forming a lateral flat seal across the film at spaced increments while the film is not being advanced;
    means for advancing the film frictionally engaging the surface thereof, said advancing means being incrementally driven to position the film relative to the cross-sealing means, said advancing means engaging the film at opposite sides of the fastener and including elongate belts with their outer surface engaging the film;
    and resilient back-up means extending along the length of the elongate belts gently urging the belts toward the film to enhance the frictional contact between the outer surface of the belts and film.

3. A mechanism for incrementally advancing a continuous sheet of plastic film having a longitudinally extendible reclosable fastener strip thereon over a vertical tubular form in a form fill and seal process constructed in accordance with claim 2:
    wherein said advancing means includes two pairs of parallel belts with rollers backing said belts.

4. A mechanism for incrementally advancing a continuous sheet of plastic film having a longitudinally extendible reclosable fastener strip thereon over a vertical tubular form in a form fill and seal process constructed in accordance with claim 3:
    including a guide in advance of the belts guiding the fastener between the belts of one of the pairs.

5. A mechanism for incrementally advancing a continuous sheet of plastic film having a longitudinally extendible reclosable fastener strip thereon over a vertical tubular form in a form fill and seal process constructed in accordance with claim 2:
    wherein the belts are opposite each other and at the same level relative to a longitudinal forming axis of the film.

6. A mechanism for incrementally advancing a continuous sheet of plastic film having a longitudinally extendible reclosable fastener strip thereon over a vertical tubular form in a form fill and seal process constructed in accordance with claim 2:
    wherein said advancing means includes a belt with its outer surface engaging the film and a plurality of support rollers urging the belt toward the film.

7. A mechanism for incrementally advancing a continuous sheet of plastic film having a longitudinally extendible reclosable fastener strip thereon over a vertical tubular form in a form fill and seal process constructed in accordance with claim 2:
    wherein the advancing means is in the form of a belt with the outer surface engaging the film and the outer surface formed of a plastic with frictional properties relative to the film.

8. A mechanism for incrementally advancing a continuous sheet of plastic film having a longitudinally extendible reclosable fastener strip thereon over a vertical tubular form in a form fill and seal process constructed in accordance with claim 2:
    wherein said advancing means is in the form of dual belts straddling the fastener, and including guide means in advance of the belts guiding the fastener between the belts.

* * * * *